United States Patent [19]

Terashita

[11] Patent Number: 4,603,969
[45] Date of Patent: Aug. 5, 1986

[54] METHOD FOR SETTING CONDITIONS IN PHOTOGRAPHIC PRINTING

[75] Inventor: Takaaki Terashita, Kaisei, Japan

[73] Assignee: Fuji Photo Film Co., Ltd., Kanagawa, Japan

[21] Appl. No.: 697,841

[22] Filed: Feb. 4, 1985

[30] Foreign Application Priority Data

Feb. 6, 1984 [JP] Japan .................................. 59-19587
Apr. 4, 1984 [JP] Japan .................................. 59-67170

[51] Int. Cl.$^4$ ...................... G03B 27/32; G03B 27/80
[52] U.S. Cl. .......................................... 355/77; 355/38
[58] Field of Search ..................................... 355/38, 77

[56] References Cited

U.S. PATENT DOCUMENTS 4,464,045 8/1984 Findeis et al. ......................... 355/38
4,492,458 1/1985 Bickl et al. ............................ 355/38
4,526,462 7/1985 Hope et al. ........................... 355/38

Primary Examiner—Richard A. Wintercorn
Attorney, Agent, or Firm—Wenderoth, Lind & Ponack

[57] ABSTRACT

A method for setting conditions in photographic printing exposure which is characterized in that an average density value $\overline{U}$ of a large number of negative films, a correction amount $D_1$ of the light source and a correction amount $D_2$ for the intended density are obtained, and when the density of the negative film to be printed is represented as U, the difference obtained by subtracting the density U from the sum of the average density value $\overline{U}$ and the correction amounts $D_1$ and $D_2$ is used as the printing condition for the negative film to be printed.

4 Claims, 4 Drawing Figures

METHOD FOR SETTING CONDITIONS IN PHOTOGRAPHIC PRINTING

BACKGROUND OF THE INVENTION

This invention relates to a method for setting conditions in photographic printing.

The conditions for developing and printing of a negative film and development of photographic paper should be optimally controlled in order to produce color prints of high quality. In the majority of photographic printing systems currently used, a reference negative film (a negative film having an average density of users) is usually used as a reference to control the printing conditions so that printing is performed at a predetermined density. The reference negative film is used to optimize the relationship between a photographic printer and a photographic paper development, and is widely used as a method for correcting undesirable effects caused in developing and controlling a large number of negative films at an average density. Such control can also be achieved by using photometric values of a negative film in printing. However, this method involves troublesome work in preparing reference films. Furthermore, since reference films are usually supplied to a development laboratory in the state already developed under standardized conditions, particular negative characteristics or the minute differences unique to a particular laboratory are not taken into account in preparation. Moreover, since such reference negative films do not include differences in region, climate and season nor consider color fading or quality fluctuations of the reference films per se, they are not able to indicate optimal printing conditions for development laboratories. As long as a reference negative film is used, all of the work for setting and controlling printing conditions have to be done manually. Since the manual work is often conducted without much care, films are printed frequently under inappropriate printing conditions.

SUMMARY OF THE INVENTION

An object of this invention is to provide a method for automatically setting conditions for a photographic printer and constantly controlling the conditions at predetermined values.

Another object of this invention is to provide a method for setting conditions in printing which gives considerations to difference in development process, region, climate and season by obtaining the conditions from an average value of users.

Still another object of this invention is to provide a method for setting conditions for photographic printing which comprises feeding light in an amount equivalent to the users' average value to a photographic paper, controlling the conditions so as to keep density deviations within a predetermined scope and preventing color fading or fluctuations, so as to thereby eliminate the troublesome work of setting printing conditions every time, and constantly print a large number of negative films under predetermined conditions.

According to this invention, in one aspect thereof, for achieving objects described above, there is provided a method for setting conditions in photographic printing exposure which is characterized in that an average density value $\overline{U}$ of a large number of negative films, a correction amount $D_1$ of the light source and a correction amount $D_2$ for the intended density are obtained, and when the density of the negative film to be printed is represented as U, the difference obtained by subtracting said density U from the sum of said average density value $\overline{U}$ and the correction amounts $D_1$ and $D_2$ are used as the printing conditions for the negative film to be printed.

According to this invention, in another aspect thereof, for achieving objects described above, there is provided a method for setting conditions in photographic printing exposure which is characterized in that an average density value $\overline{U}$ of a large number of negative films, a correction amount $D_1$ of the light source and a correction amount $D_2$ for the intended density are obtained, filters are controlled under respective conditions, the density of printed photographic paper is measured without using a negative film, and said correction amount $D_2$ is modified based upon the difference between the measured density and the intended density.

According to this invention, in still another aspect thereof, for achieving objects described above, there is provided a method for setting conditions in photographic exposure which is characterized in that an average density value $\overline{U}$ of a large number of negative films, a correction amount $D_1$ of light source and a correction amount $D_2$ for intended density are obtained for three primary colors respectively, and when the density of the negative film to be printed is represented as U, said negative film is printed with the amount calculated by subtracting said density U from the sum of said average density value $\overline{U}$ and the correction amounts $D_1$ and $D_2$, the density of printed photographic paper is measured for each of the three primary colors, and said correction amount $D_2$ is modified based on the difference between the measured densities and said intended densities.

The nature, principle and utility of the invention will become more apparent from the following detailed description when read in conjunction with the accompanying drawings.

DETAILED DESCRIPTION OF THE INVENTION

Figure 1:
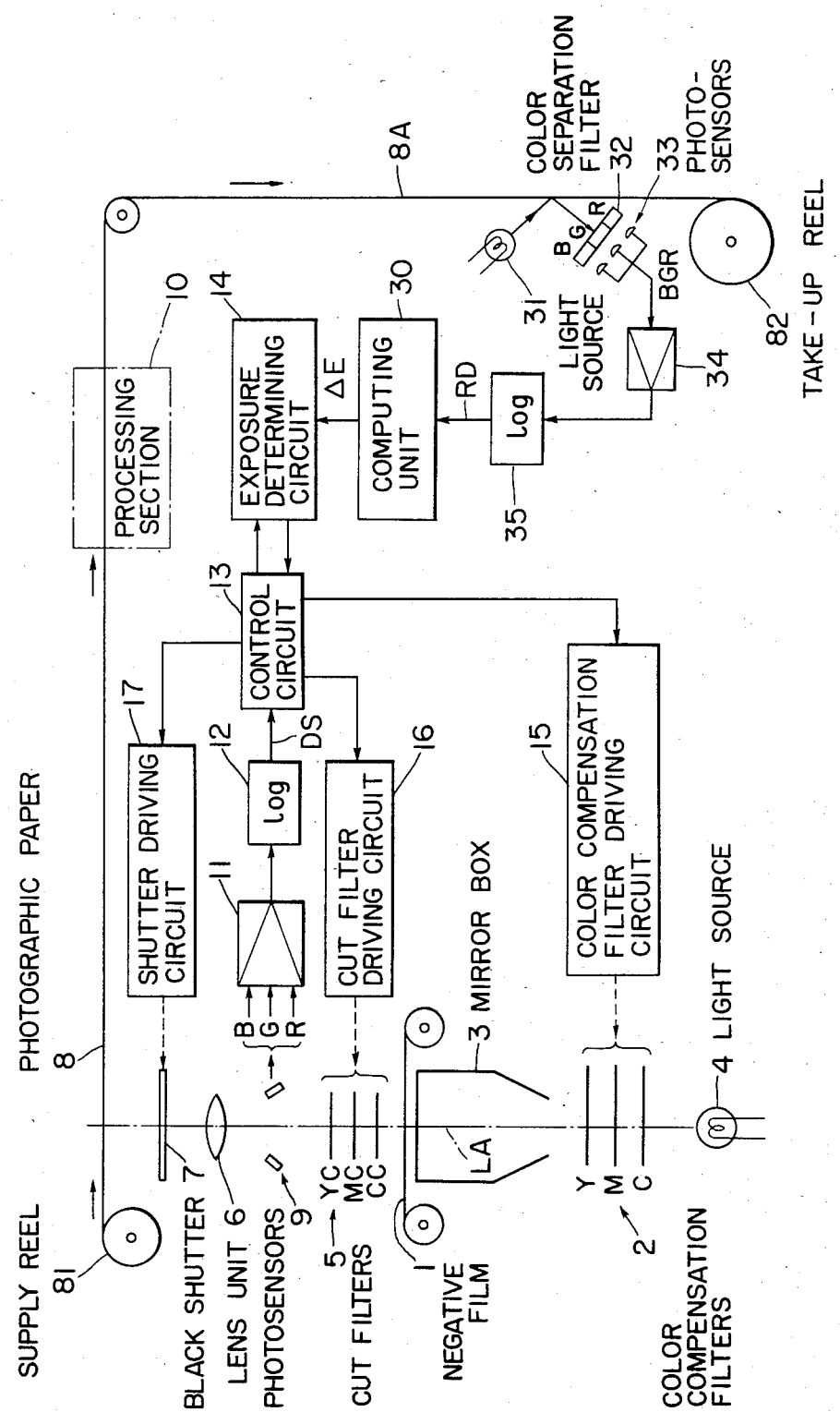
FIG. 1 is a structural view showing an embodiment of a photographic printer to which this invention method is applied.
Figure 2A:
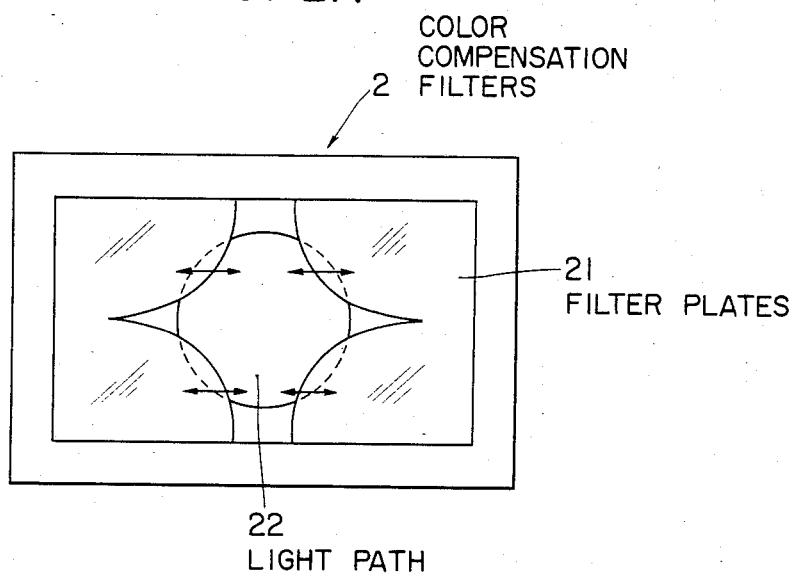
FIGS. 2A and 2B are views showing structures of color compensation filters.
Figure 2B:
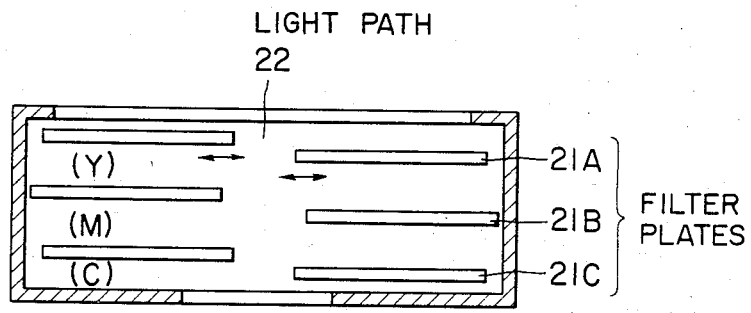

FIG. 1 shows an embodiment of a photographic printer including color compensation filters and cut filters to which this invention method is applied. In the figure, a negative film 1 is illuminated with the light from a light source 4 via color compensation filters of yellow (Y), magenta (M) and cyan (C) and a mirror box 3, and the light transmitted through the negative film 1 passes through cut filters 5 of Y, M and C, a lens unit 6 and a black shutter 7 to expose photographic paper 8. The photographic paper 8 is wound on a supply reel 81. The photographic paper 8 which has been exposed at the printing section having an optical axis LA is processed at a processing section 10 for development, bleaching, fixing, washing and drying, and is reeled on a take-up reel 82. Photosensors 9 such as photodiodes are provided near the negative film 1 on the side of the lens unit 6 to detect the image density in three primary colors blue (B), green (G) and red (R). Detection signals for each of BGR from the photosensors 9 are amplified by amplifiers 11, converted into density signals DS by logarithmic converters 12 and inputted into a control circuit 13 which determines printing conditions together with an exposure determining circuit 14. The color compensation filters 2 are controlled by a color compensation filter driving circuit 15, the cut filters 5 are controlled by a cut filter driving circuit 16, and the black shutter 7 is controlled by a shutter driving circuit 17 to print the negative film 1 which has been conveyed to the printing section. The color compensation filters 2 which are used for color compensation herein may have a structure as shown in FIGS. 2A and 2B. Three filter plates 21 (21A through 21C) of a sectoral quadrant shape are combined for each of the three colors of yellow (Y), magenta (M) and cyan (C). A pair of filter plates 21A to 21C or a left and a right filter plates are relatively moved in horizontal direction to adjust the amount of light transmitted through a central light path 22 for each color. The movement of the filter plates 21A through 21C is controlled for each color by the driving circuit 15. Respective filter plates 21A through 21C are approximated to the spectral transmittance distribution of the negative film dyes so as to print images of excellent quality. According to this invention, the actual printing density of a printed photographic paper 8A is measured at a stage subsequent to the printing at the processing section 10. The processed photographic paper 8A is illuminated by a light source 31 and the light reflected therefrom is detected for each of BGR by photosensors 33 such as photodiodes via a color separation filter 32, amplified by amplifiers 34 and converted into density values RD by logarithmic converters 35. The density values RD are inputted into an computing unit 30 which examines the relationship between the printing density and the exposure, and corrects them with an amount of correction which has been determined by the exposure determining circuit 14 when predetermined conditions are met.

Figure 3:
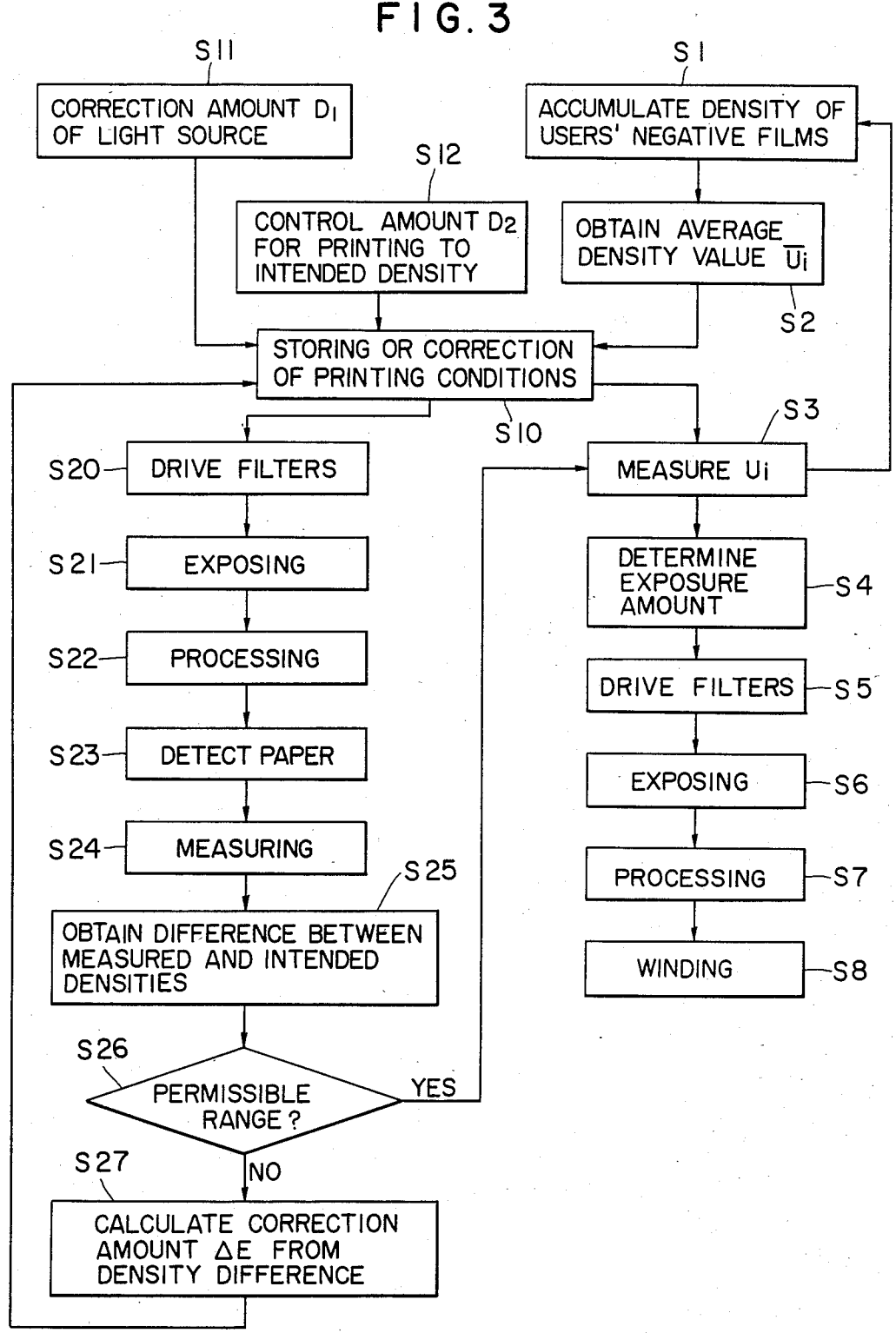
FIG. 3 is a flowchart to explain this invention method.

Operation will now be described in more detail referring to the flow chart of FIG. 3.

According to this invention, a large number of negative films (e.g., 1,000 pieces) are photographically measured (Step S3) by photosensors 9 at each laboratory to obtain an average density $\overline{U}_i$ (i=B, G, R) for each of B, G and R (Steps S1 and S2). The average density value $\overline{U}_i$ is equivalent to the density of a conventional reference negative film, and it is obtained by incorporating the particular characteristics and conditions in processing of a photographic printer used in photometry, climatic and seasonal differences and the like. The average density value $\overline{U}_i$ of negative films may be obtained from the national average value or the average value of several photographic printers instead of the particular printer used. With reference to thus obtained average density value $\overline{U}_i$, the density of 0.5 or less is termed as "under-negative" (j=1), that of 1.0 or more as "over-negative" (j=2) and that therebetween as "normal negative" (j=3). The average of these three classes is the average density value $\overline{U}_{ij}$. In the photographic printer of the type as shown in FIG. 1 where color compensation filters 2 comprise the three colors of Y, M and C, the exposure time for each color can be made constant if the amount of light for three colors is adjusted by varying the area inserted in a light path 22 or varying transmission factors. In this case, the system does not require the cut filters 5 and the cut filter driving circuit 16. The exposure time may be changed depending on the density of negative film 1. In this case, the exposure time must be controlled by cut filters 5 for each color. Color compensation filters 2 and cut filters 5 may also be combined in a printer system. It is desirable to make the spectral sensitivity characteristics of the photosensors 9 coincide with or approximate to the spectral sensitivity characteristics of photographic paper 8. If the sensitivity characteristics are not aligned, it is recommended that a correction value be obtained by using spectral sensitivity distributions of the photosensors 9 and the photographic paper 8 in advance so as to be able to correct the value constantly.

The density of a negative film 1 may be obtained from the amount of light measured by the photosensors 9 at a predetermined filter position. Therefore, the amount to be corrected is obtained by determining the filter position where the amount of light received is constant in absence of the negative film 1, then amplifying the value of light amount of the photosensors 9 by amplifiers 11 and then logarithmically converting the value into the value $D_1$ by logarithmic converters 12 (Step S11). If the color compensation filters 2 are controlled to $(D_1+\overline{U}_{ij})$ by the control circuit 13 and the color compensation filter driving circuit 15 to achieve the average density value $\overline{U}_{ij}$, the light in an amount equivalent to the reference negative film can be given to the photographic paper 8 without using a reference negative film. In order to expose the photographic paper 8 at the intended density in BGR, the filter plates 21A through 21C of the color compensation filters 2 are controlled $(D_2)$ by the control circuit 13 and the driving circuit 15 (Step S12). The standard printing conditions $(D_1+D_2+\overline{U}_{ij})$ can be obtained to give a predetermined amount of light onto the photographic paper 8 just as a reference negative film is used. The value is stored in memory (Step S10). The above mentioned steps S1 and S2 and steps S10 through S12 are executed in the control circuit 13 and the exposure determining circuit 14. If the density of a negative film which is to be printed is similarly measured by the photosensors 9 and the value is represented as U and the control of the color compensation filters 2 as $D_3$, the following relationship holds:

$$U+D_3=D_1+D_2+\overline{U}_{ij} \qquad (1)$$

Therefore, the unknown control amount $D_3$ can be calculated from the formula below (Step S4):

$$D_3=D_1+D_2+\overline{U}_{ij}-U \qquad (2)$$

Exposing is conducted by controlling the color compensation filters 2 (and/or the cut filters 5) (Step S6), and the exposed paper is processed for development, etc. at the processing section 10 (Step S7) and wound on a take-up reel 82 (Step S8). The photographic paper may be cut in a predetermined length instead of being wound on the take-up reel 82.

Alternatively, the color compensation filters 2 may be driven until the time that they becomes equal to $(D_1+D_2+\overline{U}_{ij})$ when the negative film 1 is U. As it takes much time to repeatedly control the color compensation filters 2 for measurement and focusing, the operation may be combined with the one represented by formula (2).

For setting printing conditions by the control circuit 13 and the exposure determining circuit 14 in a printer, it is necessary to obtain in advance the correction amount $D_1$ and the control amount $D_2$ so as to make the amount of light constant. The correction amount $D_1$ for light source variation may be included within the control amount $D_2$. In this case, the correction amount $D_1$ should be calculated every time the light source is changed (for instance, daily). The printing conditions may be controlled either by adjusting the value $D_2$ in a manner that the predetermined printing density of the photographic paper 8A is maintained at a constant value or by controlling the value $D_2$ in a manner that the amount of light under the standard printing conditions $(D_1+D_2+\overline{U}_{ij})$ is kept at a constant value. The latter is simple. The printing conditions may be set or controlled thereafter in different methods. Alternatively, the values $D_1$, $D_2$, $\overline{U}_{ij}$ or U may be measured or controlled either in combination or separately. The average density value $\overline{U}_{ij}$ may be the average value of the densities observed up to the day before or the average of the densities of a given period of time. Furthermore, the average density value $\overline{U}_{ij}$ may be prepared by processing plural raw data with smoothing or interpolating.

It is possible to monitor the negative film development processing simply by monitoring the average density value $\overline{U}_{ij}$. As the printing with the color compensation filters 2 alone corresponds to a negative film without contrast, and there may be a slight difference in characteristic outputs particularly in the non-linear section, it is desirable to seek the relationship between the average density and the average density of essential sections from a large number of negative films photographed by users in advance so as to be able to correct the above mentioned method. The correction value may take the gradation of each photographic paper into account.

According to this invention, the above correction amount $D_2$ is corrected based upon the degree of difference between the intended density and the measured density value of a particular photographic paper 8A which has been actually printed in order to perform optimal control over the printing operation. More specifically, color compensation filters 2 (and/or cut filters 5) are driven under the printing conditions set at the above mentioned Step S10 (Step S20), and the photographic paper 8 is exposed at the printing section (Step S21) and processed for development, etc. at the processing section 10 (Step S22). Frames of the paper 8A on which images have been printed are detected (Step S23) by simply detecting the passage of the photographic paper 8, by detecting the passage of a predetermined duration of time from the printing operation (e.g. 10 minutes), or by detecting that a predetermined length of paper has been transferred from the printing section (e.g. 2 m). The position for this detection is aligned with the position of the light source 31 in FIG. 1. The light from the light source 31 is reflected from the printed photographic paper 8A to be inputted in the photosensors 33 via a color separation filter 32 and the detection signals for BGR are respectively amplified by the amplifiers 34 to be inputted into logarithmic converters 35. In this manner, the printing density values RD of the paper 8A which has been printed can be respectively obtained for three colors (Step S24). This photographic measurement may be conducted after the paper is cut. Thus obtained printing density value RD is compared with the intended density by the computing unit 30 and whether or not the difference therebetween remains within a permissible range (Steps S25 and S26) is judged. If the difference remains in the permissible scope, then the process proceeds to the above mentioned step S3 for repeatedly conducting printing and processing (Steps S3 through S8). The permissible difference is, for instance, ±0.03. If the difference is outside the range, on the other hand, a correction amount $\Delta E$ required for the particular difference is calculated (Step S27) and the printing condition $D_2$ which has been stored at Step S10 is corrected to $(D_2+\Delta E)$. An alarm may be outputted by means of a lamp and so on. The above formula (1) becomes $$U+D_3=D_1+(D_2+\Delta E)+\overline{U_{ij}} \tag{3}$$

The control amount $D_3$ will be $$D_3=D_1+D_2+\Delta E+\overline{U_{ij}}-U \tag{4}$$

With the above formulae, the exposure amount determined at the above step S4 is corrected to modify subsequent printing process. In this manner, the density of printing is constantly adjusted to be the intended value. The steps S10 through S12 and S20 through S27 in FIG. 3 show the procedure of setting and controlling of printing conditions while the steps S1 through S8 and S10 the procedure of printing of users' negative films. As mentioned above, this invention enables to achieve fully automated process for setting and controlling conditions as it completely eliminates the variable factors which conventionally affect the amount of the light in printing such as fluctuations in negative film development process, printers and paper development process, without using the measurement of users' negative film density and negative films. This invention comprises steps of irradiating photographic paper with the light in an amount equivalent to the users' average negative film, correcting the light source for printing, monitoring the modification of the process after the development of paper and correcting the exposure conditions.

Although the values $D_1$, $D_2$, $D_3$, $\overline{U}_{ij}$ and U are described as density values in the foregoing statement, it is possible to calculate and control them in terms of the amount of transmitted light or the filter position.

Printing conditions may be set in a manner similar to the above even in the photographic printer of a three color luminance-change type with three light sources of RGB which is adapted to print by varying the luminance of three colors so far as the negative films can be precisely measured and exposure on the photographic paper is accurately controlled. It is desirable in this case that the filters of RGB used as light sources are bandpass filters. If conditions require broad filters as the amount of light is not sufficient, it is necessary to determine correction value by using the spectral sensitivity of the paper at a given amount of light and the spectral sensitivity of the photosensors in advance. If this invention method is applied to photographic printers of a white-light subtractive type wherein the amount of RGB light is controlled timewise by cut filters, it is necessary to obtain the amount of RGB light illuminated onto the photographic paper taking into account irregular absorption by the cut filters as well as reciprocity law failure. This involves complicated operations. In the case where the photosensor can measure the light through cut filters of YMC, it is possible to set conditions in the manner similar to the above. Although the density of the printed paper is measured with reflected light in the above description, it may be measured with transmitted light.

As this invention method obtains and sets the printing conditions from the users' average value, it is possible to include the difference in development fluctuations, climate, season in a set value. Since this invention method feeds the light in an amount equivalent to the users' average value to the photographic paper without using negative films to keep the density at a given balance, it can be controlled to eliminate density variations or color fading. This invention method also eliminates complicated operation in setting conditions for each time to thereby facilitate photographic printing of a large number of negative films constantly under a predetermined conditions.

Since it is not necessary to prepare nor use reference negative films, the photographic printing operation can be performed at a higher efficiency. As this invention method enables automatic setting of printing conditions as well as automatic control thereof, the steps which conventionally required skilled manual labor can be automated fully to enhance the efficiency to a remarkable degree.

It should be understood that many modifications and adaptations of the invention will become apparent to those skilled in the art and it is intended to encompass such obvious modifications and changes in the scope of the claims appended hereto.

What is claimed is:

1. A method for setting conditions in a photographic printing system in which an exposure amount for a photographic paper is controlled by inserting and removing color compensation filters in a photographic printing light path, which comprises the steps of:

measuring a light amount with a photosensor by inserting and removing the color compensation filters from the light path;

calculating a correction amount $D_1$ for light source variations in comparison with a reference value on the basis of the light amount measurement;

calculating a control amount $D_2$ needed to effect a desired density for a photographic paper on the basis of a difference value determined from a previously stored standard negative film density $\overline{U}$ and the calculated correction amount $D_1$;

storing the correction amount $D_1$ and the control amount $D_2$;

respectively changing the standard negative film density $\overline{U}$, the correction amounts $D_1$ and the control amount $D_2$ in accordance with respective detected variations thereof; and controlling the inserting and removing of the color compensation filters so that an amount of light corresponding to an exposure reference value which impinges on the photographic paper is equal to an exposure reference value which is obtained by combining the difference value and the control amount $D_2$.

2. A method as claimed in claim 1, wherein said standard negative film density $\overline{U}$ is an average density value of a large number of negative films which have been sensed by the photosensor.

3. A method for setting conditions in a photographic printing system in which an exposure amount for a photographic paper is controlled by inserting and removing color compensation filters in a photographic light path, which comprises the steps of:

calculating an exposure correction value $D_2$ necessary to print on the photographic paper with a desired density;

based on a negative film density which is an average density of a large number of negative films, and based on the correction value $D_2$, inserting and removing color compensation filters; and exposing the photographic paper using the color compensation filters.

4. A method for setting conditions in a photographic printing system in which an exposure amount for a photographic paper is controlled by means of inserting and removing color compensation filters in a photographic light path, which comprises the steps of:

controlling the inserting and removing of the color compensation filters according to: a correction amount $D_1$ corresponding to a light source variations with respect to a reference value which is detected by photosensors, and a control amount $D_2$ needed to make a desired density for the photographic paper, and a standard negative film density $\overline{U}$;

comparing the standard negative film density $\overline{U}$ with a density of a negative film to be printed and calculating a modified exposure amount in response thereto;

controlling and inserting time of cut filters in the light path according to said modified exposure amount so as to thereby change the effective exposure time.

* * * * *